(12) United States Patent
Burd

(10) Patent No.: US 11,097,844 B1
(45) Date of Patent: Aug. 24, 2021

(54) MOBILE SELF-VENDING BEVERAGE DISTRIBUTION SYSTEM

(71) Applicant: B/E AEROSPACE, INC., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/823,042

(22) Filed: Mar. 18, 2020

(51) Int. Cl.
| | |
|---|---|
| *B65D 88/14* | (2006.01) |
| *B64D 11/00* | (2006.01) |
| *G07F 11/00* | (2006.01) |
| *B65D 90/18* | (2006.01) |
| *B65D 90/00* | (2006.01) |
| *G07F 7/00* | (2006.01) |

(52) U.S. Cl.
CPC .......... *B64D 11/0007* (2013.01); *B65D 88/14* (2013.01); *B65D 90/0066* (2013.01); *B65D 90/18* (2013.01); *G07F 7/005* (2013.01); *G07F 11/005* (2013.01); *G07F 11/007* (2013.01)

(58) Field of Classification Search
CPC ....................................................... B65D 88/14
See application file for complete search history.

(56) References Cited

U.S. PATENT DOCUMENTS

| | | | |
|---|---|---|---|
| 3,932,847 A | 1/1976 | Smith | |
| 4,576,272 A | 3/1986 | Morgan, Jr. et al. | |
| 5,504,878 A | 4/1996 | Coscarella et al. | |
| 5,859,595 A | 1/1999 | Yost | |
| 6,234,345 B1 | 5/2001 | Minh et al. | |
| 7,364,050 B2 * | 4/2008 | Guard ................... | B60P 3/0257 221/131 |
| 7,512,826 B2 | 3/2009 | Armstrong et al. | |
| 7,617,410 B2 | 11/2009 | Check et al. | |
| 8,132,038 B2 | 3/2012 | Dahlen et al. | |
| 8,161,756 B2 | 4/2012 | Kutta et al. | |
| 8,438,415 B2 | 5/2013 | Engler et al. | |

(Continued)

FOREIGN PATENT DOCUMENTS

| | | |
|---|---|---|
| DE | 4308144 C1 | 10/1994 |
| EP | 3515820 A1 | 7/2019 |

(Continued)

OTHER PUBLICATIONS

Department of Defense Interface Standard, Interoperability and Performance Standards for Medium and High Frequency Radio Systems, Dec. 22, 2017, Appendix G, G.5.7.4 and G.5.7.6, 5 pages.

(Continued)

*Primary Examiner* — Gene O Crawford
*Assistant Examiner* — Ayodeji T Ojofeitimi
(74) *Attorney, Agent, or Firm* — Suiter Swantz pc llo

(57) ABSTRACT

A mobile self-vending beverage dispenser is disclosed. In embodiments, the dispenser includes a mobile housing divided into segmented sections. Each segmented section includes an outlet at the bottom for dispensing canned beverages and an access hatch for loading canned beverages into the segmented section. Each segmented section includes a vertical staggered raceway extending from the access hatch to the outlet via which the segmented section is loaded with canned beverages, the cans traveling in a gravity-assisted path downward to the outlet for dispensing upon request.

10 Claims, 14 Drawing Sheets

(56) References Cited

U.S. PATENT DOCUMENTS

| | | |
|---|---|---|
| 9,352,838 B2 | 5/2016 | Godecker et al. |
| 9,445,665 B2 | 9/2016 | Huang et al. |
| 9,981,746 B2 | 5/2018 | Lee et al. |
| 2004/0108327 A1* | 6/2004 | Baack .................... G07F 11/24 221/124 |
| 2004/0226960 A1 | 11/2004 | Aguirre et al. |
| 2006/0011625 A1 | 1/2006 | Arnold |
| 2008/0001031 A1 | 1/2008 | Doebertin et al. |
| 2008/0136299 A1 | 6/2008 | Peurifoy |
| 2015/0057796 A1 | 2/2015 | Boodaghians |
| 2015/0266580 A1 | 9/2015 | Lee et al. |
| 2016/0221593 A1 | 8/2016 | Broom et al. |
| 2018/0016014 A1 | 1/2018 | Burd et al. |
| 2018/0118349 A1 | 5/2018 | Rowe et al. |
| 2019/0158204 A1 | 5/2019 | Luo et al. |

FOREIGN PATENT DOCUMENTS

| | | |
|---|---|---|
| GB | 2388098 A | 11/2003 |
| WO | 2019043158 A1 | 3/2019 |

OTHER PUBLICATIONS

Extended Search Report for European Application No. 20213839.2 dated Jun. 24, 2021, 9 pages.

\* cited by examiner

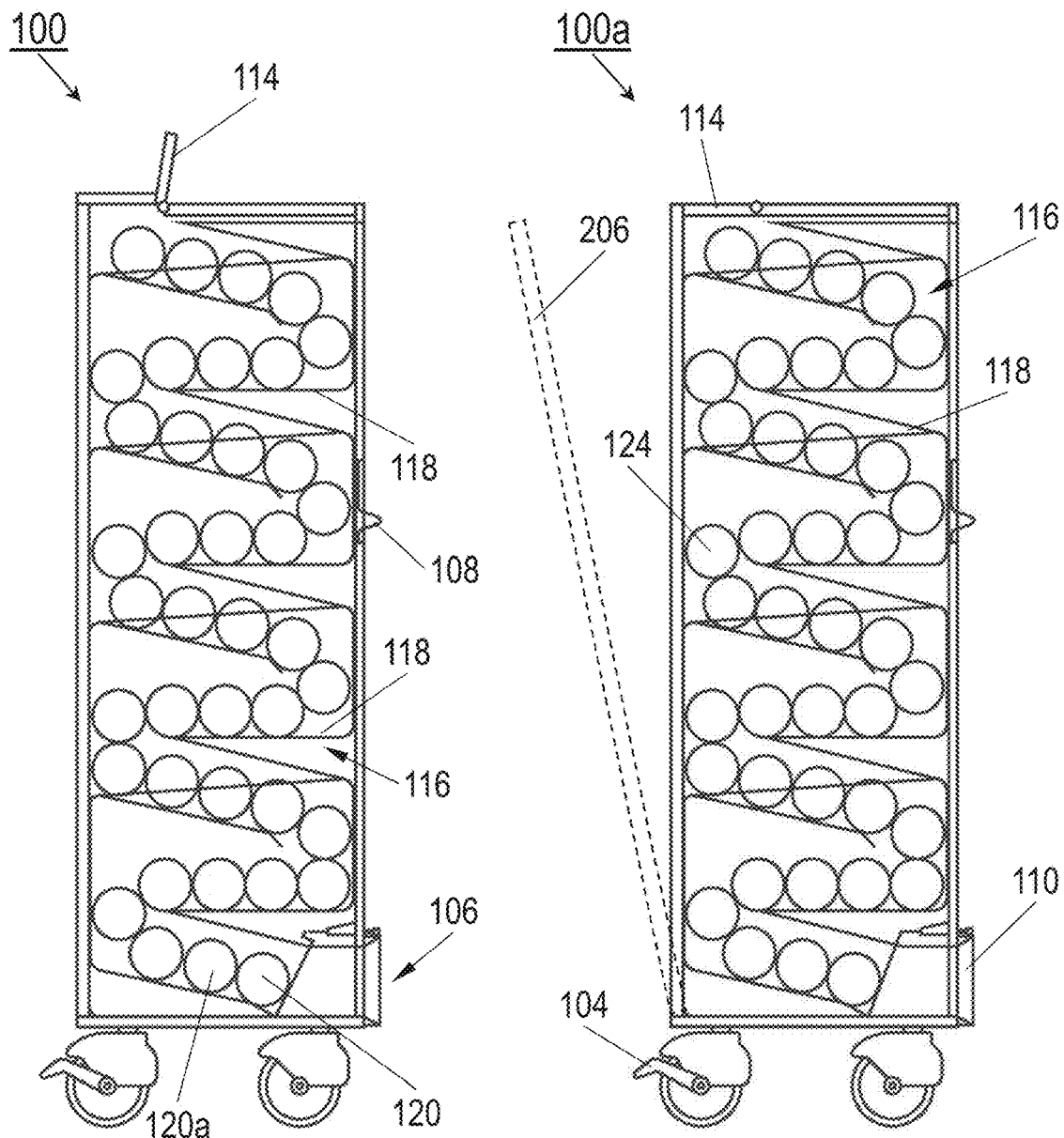
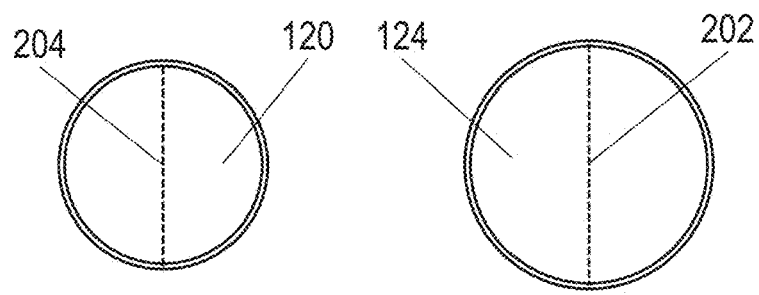
FIG. 2

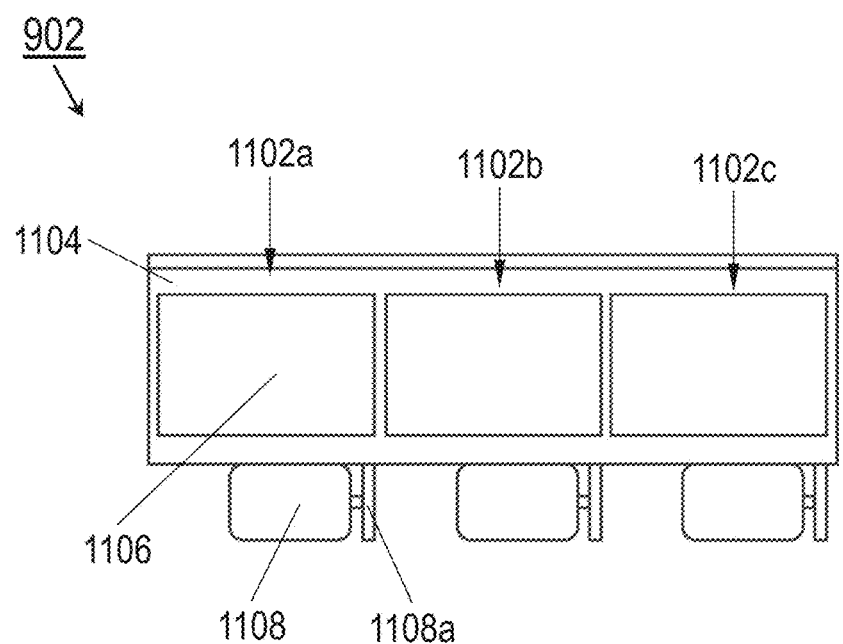
FIG. 11A
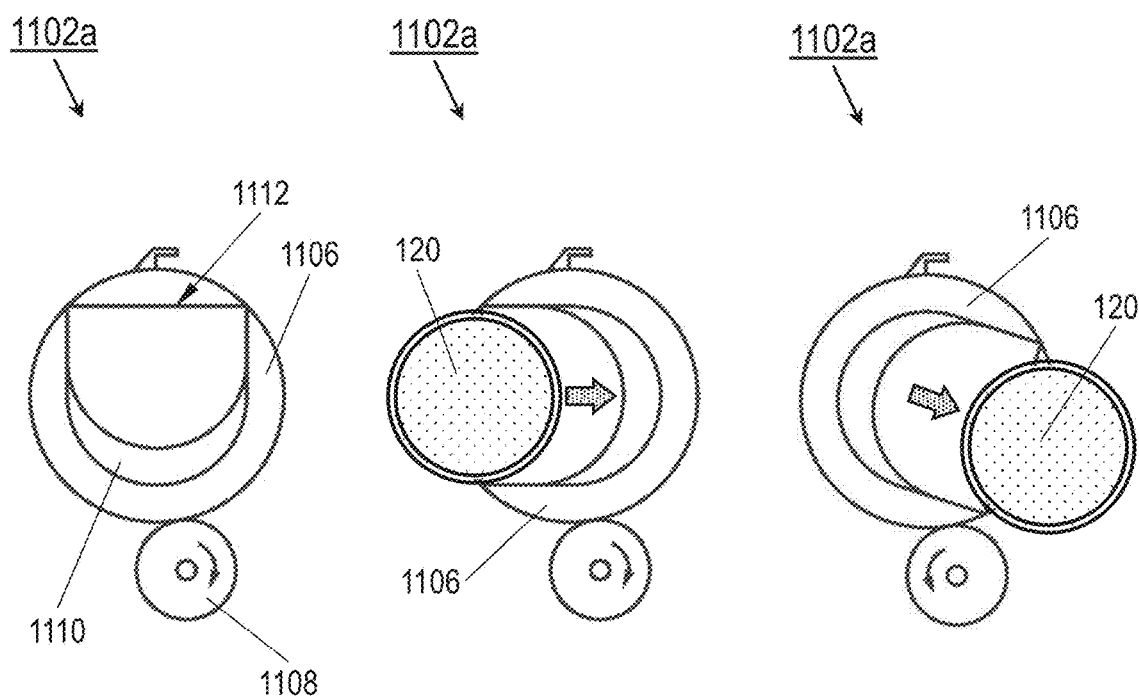
FIG. 11B  FIG. 11C  FIG. 11D

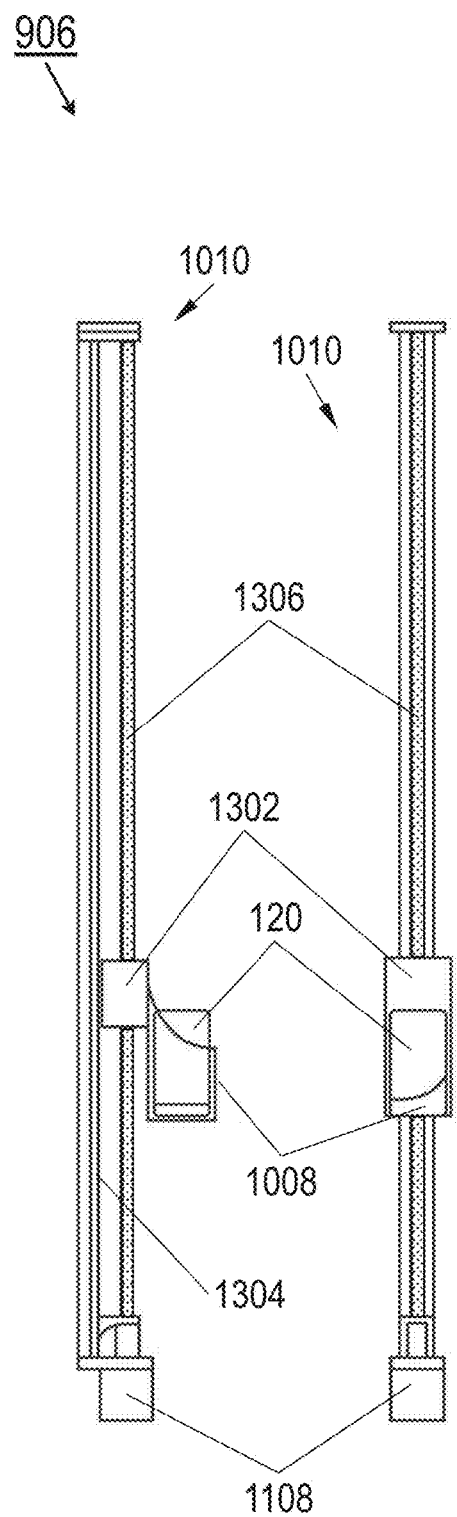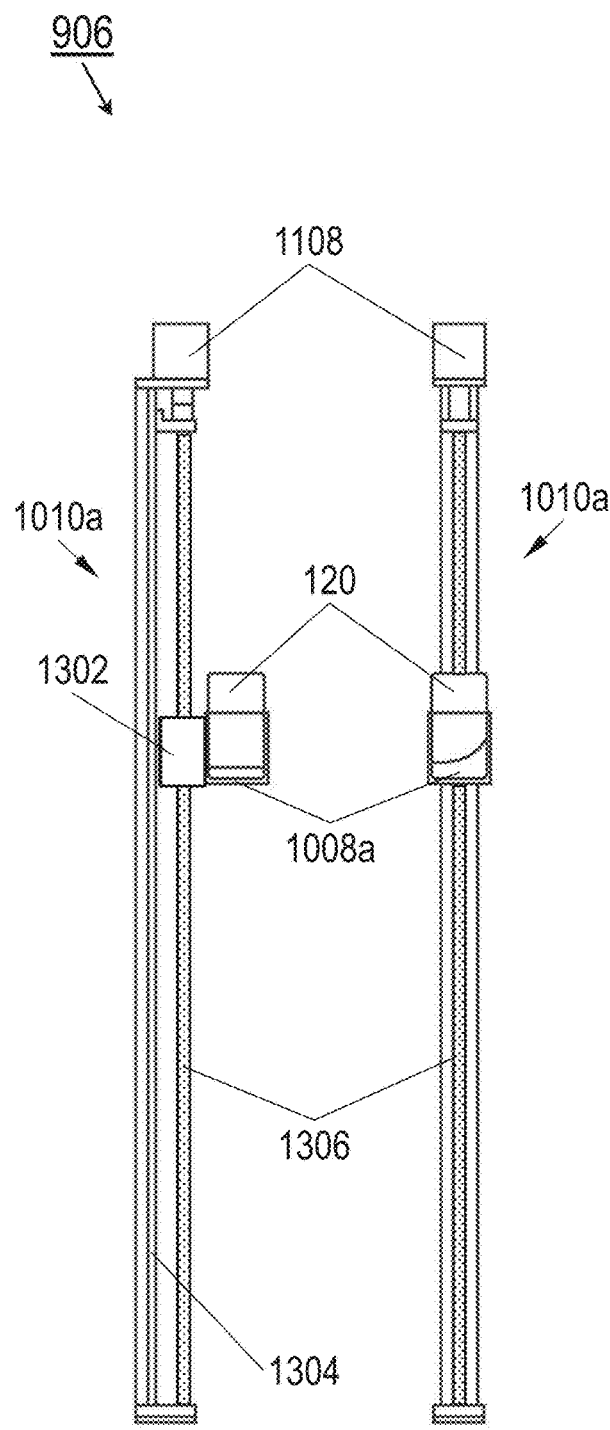
FIG. 13A  FIG. 13B

MOBILE SELF-VENDING BEVERAGE DISTRIBUTION SYSTEM

BACKGROUND

Larger passenger aircraft may have additional cabin space not occupied by passenger seating but otherwise unused inflight. While, for example, catering and refreshment services may provide passengers with an opportunity to socialize (and airlines with the opportunity to generate additional revenue), these services may require cabin crewmembers whose presence may be more effectively utilized elsewhere.

SUMMARY

A mobile self-vending beverage dispensing cart is disclosed. In embodiments, the mobile self-vending beverage dispensing carter includes a mobile housing divided into segmented sections (e.g., three or more). Each segmented section includes an outlet at the bottom for dispensing canned or bottled beverages and an access hatch for loading canned beverages into the segmented section. Each segmented section includes a vertical staggered raceway extending from the access hatch the outlet via which the segmented section is loaded with canned beverages, the cans traveling in a gravity-assisted path downward to the outlet for dispensing upon request.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 includes right side/end cutaway views of the beverage distribution device of FIG. 1;

FIGS. 11A and 11B-D are respectively overhead and profile views of a selection device of the beverage distribution station of FIGS. 6 and 7;

FIGS. 13A and 13B are detailed profile and forward views illustrating operations of the can lift device of the beverage distribution station of FIGS. 6 and 7;

DETAILED DESCRIPTION

Figure 1:
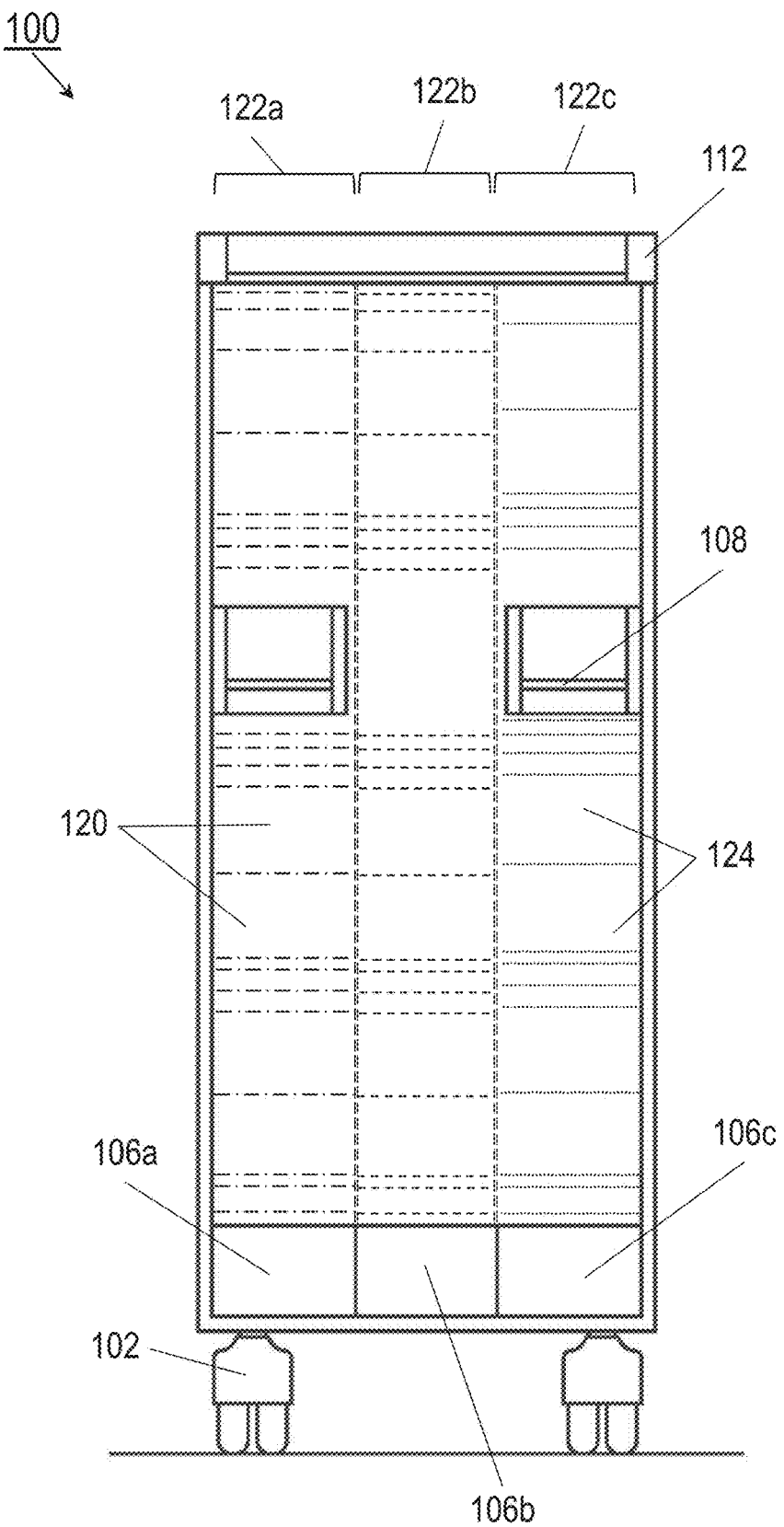
FIG. 1 includes a forward and right side/end (e.g. for standard size vs. half size carts) profile view of a mobile self-vending beverage distribution device according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally to FIGS. 1 and 2, a mobile self-vending beverage cart 100 is disclosed. The beverage cart 100 may include casters 102, caster lock 104, outlets 106a-c, latch bars 108, bellow seals 110, handle 112, access hatch 114, raceways 116, and raceway components 118.

In embodiments, the beverage cart 100 may be transportable (e.g., via handle 112) along flat surfaces via casters 102 mounted to its underside; for example, the casters may be locked via caster lock 104 to secure the beverage cart in place. In some embodiments, the casters 102 may be configured for omnidirectional travel. For example, the beverage cart 100 may be proportioned or sized comparably to a galley cart or trolley of standard size, transportable along an aisle within a passenger cabin of an aircraft or other vehicle of sufficient interior size. In some embodiments, the beverage cart 100 may correspond to a standard half-size cart (e.g., FIGS. 1 and 2 then showing an end, rather than a side, of the half-size cart as stowed in a standard size cart bay).

In embodiments, the beverage cart 100 may be configured for the loading and dispensing of canned beverages 120. For example, the interior of the beverage cart 100 may be divided into a group of segmented sections 122a-c, each segmented section loaded with a particular type (e.g., brand, size) of canned beverage and configured to dispense said beverage via an outlet 106a-c dedicated to that particular segmented section.

For example, referring in particular to FIG. 2, a quantity of canned beverages 120 (e.g., canned beverage containers, or other like vendable containers having a substantially cylindrical shape) may be loaded into the beverage cart 100 via the access hatch 114. Once loaded into the beverage cart 100, the canned beverages 120 may be capable of gravity-assisted travel along a substantially vertical raceway 116; for example, the raceway may comprise a series of individual interior ramps 118 mounted to interior surfaces of the beverage cart (e.g., one raceway for each segmented section 122a-c) and extending downward from the access hatch 114 to the outlet 106, where the canned beverages 120 may be individually dispensed from the beverage cart. Each outlet 106 may include a bellow seal 110 enabling the beverage cart 100 to connect, via the outlet, to a freestanding beverage distribution system as described in greater detail below.

In embodiments, each segmented section 122a-c of the beverage cart 100 may be pre-loaded with a quantity of canned beverages 120. For example, when a canned beverage 120 is dispensed via the outlet 106, the canned beverage 120a immediately following it may slide into its place, assisted by gravity, until it too is dispensed, the remaining canned beverages following in sequence.

In embodiments, the beverage cart 100a may be implemented and may function similarly to the beverage cart 100, except that the beverage cart 100a (or, e.g., one or more segmented sections 122a-c thereof) may be configured to dispense a canned beverage 124 having a larger diameter 202 than the diameter 204 of the canned beverage 120. For example, the beverage carts 100, 100a may be configured (via their individual segmented sections 122a-c) for the dispensing of multiple types, brands, or volumes of alcoholic or nonalcoholic canned beverages 120, 124 having different diameters and/or volumes (e.g., the four can sizes 250 ml/8.45 fl. oz.; 330 ml/11.15 fl. oz; 355 ml/12 fl. oz; and 400 ml/13.5 fl. oz. compatible with the raceways without the need for any additional modification), the interior raceways 116 being sized or dimensioned to fit canned beverages of a given diameter or volume. In some embodiments, the interior raceways 116 may be resized or otherwise modified to accommodate additional types of substantially or partially cylindrical beverage containers (e.g., 125 mL or 175 mL miniature wine bottles; 20 oz soda pop bottles; premixed cocktails and spirits).

In some embodiments, the beverage cart 100a may include a rear access door 206 (e.g., rear access panel) allowing the loading of a complete segmented section 122a-c into the beverage cart (e.g., including a raceway 116 loaded with a full complement of canned beverages 120, 124) via the rear access door.

Figure 3A:
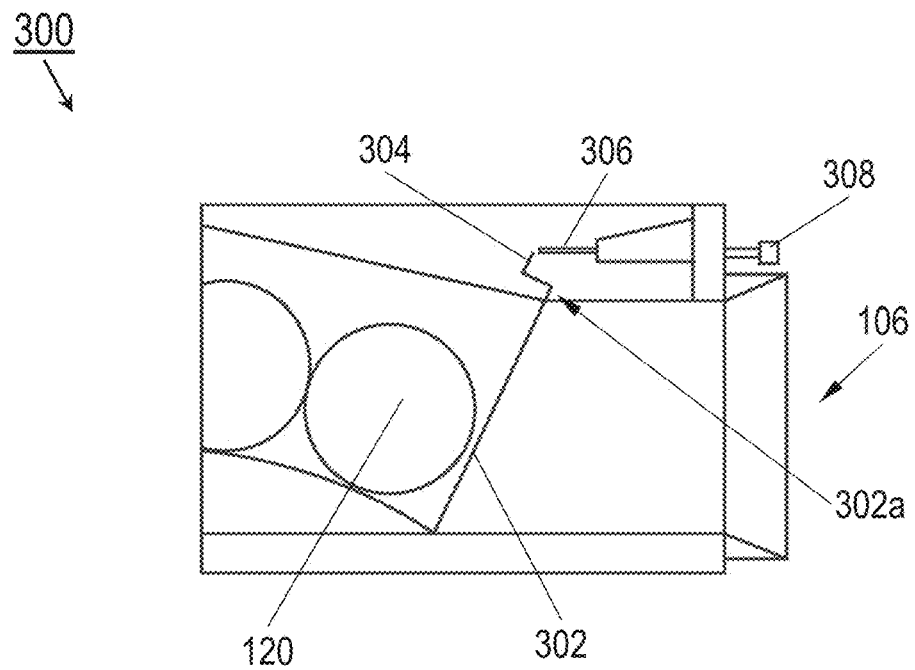
FIGS. 3A and 3B are detailed cutaway views of an outlet of the beverage distribution device of FIG. 1.

Referring to FIG. 3A, the flap release mechanism 300 is shown. The flap release mechanism 300 may include retaining flap 302, flap retaining catch 304, detached plunger 306, and plunger actuator 308.

In embodiments, the retaining flap 302 may be bottom-hinged (302a) and spring-loaded to secure the next-to-be-dispensed canned beverage 120 until it is dispensed via the outlet 106. For example, the plunger actuator 308 may be configured for actuation by an appropriately sized spacer mounted on a galley wall (or, e.g., within a beverage dispensing station as described below). Actuation of the plunger actuator 308 may in turn actuate the detached plunger 306 (e.g., detached from the retaining flap 302) into the flap retaining catch 304, driving the retaining flap forward to release the canned beverage 120. The flap release mechanism 300 may enable the use of the rear access door (206, FIG. 2) for loading of a complete, fully loaded segmented section (122a-c, FIG. 1) into the beverage cart (100/100a, FIG. 2).

Figure 3B:
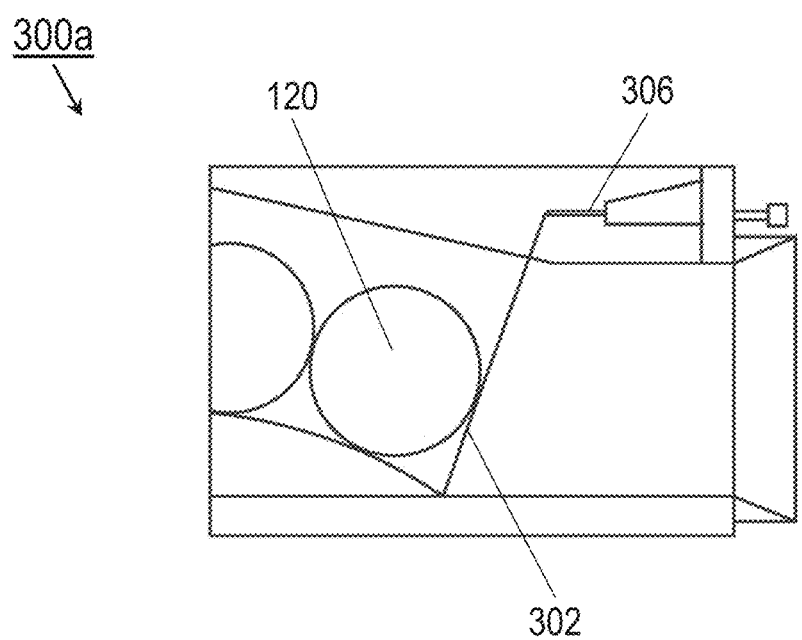

Referring now to FIG. 3B, the flap release mechanism 300a may be implemented and may function similarly to the flap release mechanism 300 of FIG. 3A, except that the flap release mechanism 300a may include a mechanically linked retaining catch rod 306a linked to the retaining flap 302, which drives the retaining flap backwards to release the canned beverage 120.

Figure 4B:
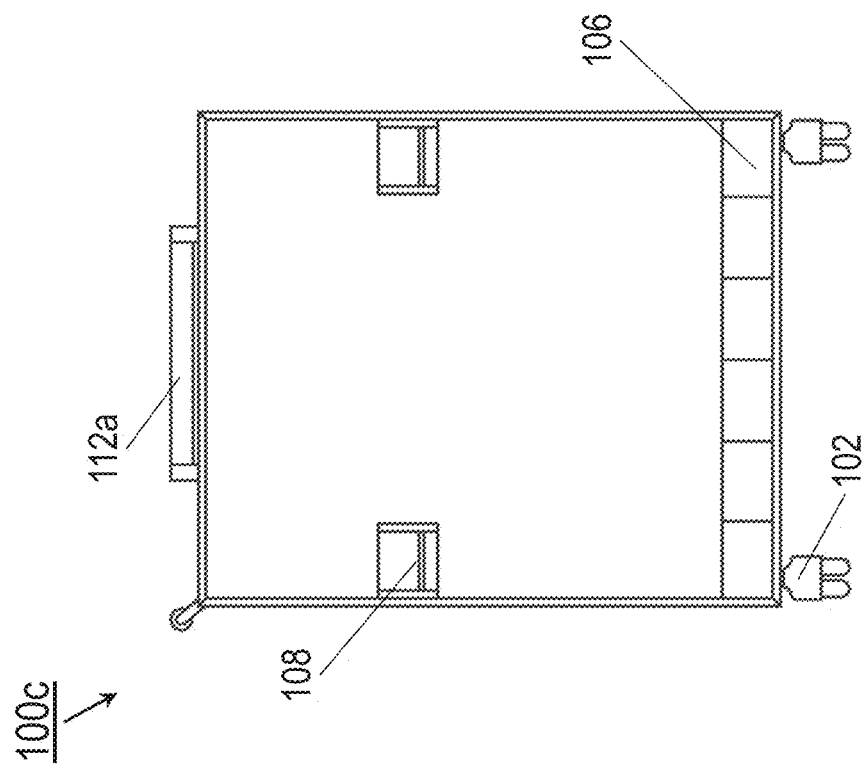
FIGS. 4A and 4B are forward views of the beverage distribution device of FIG. 1 in alternative configurations.
Figure 4A:
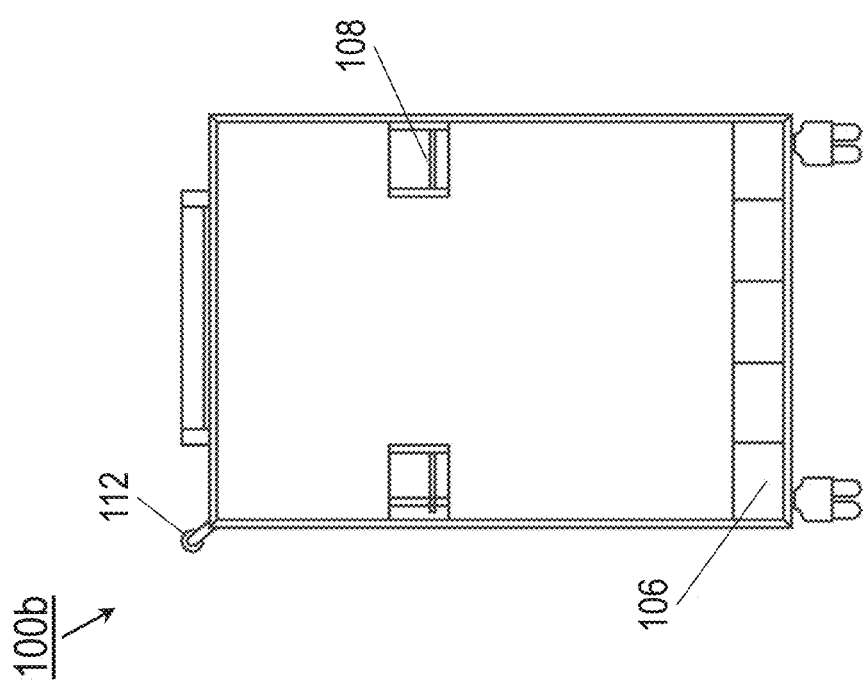

Referring to FIGS. 4A and 4B, the beverage carts 100b-c may be implemented and may function similarly to the beverage carts 100, 100a of FIGS. 1 and 2, except that the beverage carts 100b-c may be configured for larger groups of outlets 106 and internal raceways (116, FIG. 2) and therefore the dispensing of more types, brands, or sizes of canned beverages (120/124, FIG. 2).

In embodiments, the beverage carts 100b-c may be respectively sized to accommodate five or six outlets 106 and five or six internal raceways 116. Further, the beverage carts 100b-c may be configured so that the internal raceways 116 run, and canned beverages 120, 124 are dispensed from the outlets 106, in a transverse direction relative to the handle 112 and the "forward" direction of travel (e.g., perpendicular to the raceways 116 within the beverage cart 100, 100a shown by FIGS. 1 and 2; "forward" here may refer to the direction in which the beverage carts 100b-c may most likely be propelled via the handle 112, although the casters 102 may allow for omnidirectional travel). In some embodiments, the beverage carts 100b-c may include an additional handle 112a mounted transversely.

In some embodiments, the beverage carts 100b-c may be configured for stowage within an ARINC standard galley, e.g., provided intermediate retainers are appropriately positioned within the cart bays, allowing the beverage carts 100b-c to be transported and chilled inflight via the galley refrigeration system.

In embodiments, the latch bars 108 enable the beverage carts 100b-c (as well as the beverage carts 100, 100a of FIGS. 1 and 2) to be secured within a dispensing station as described in greater detail below. In some embodiments, the latch bars 108 (or the corresponding latches, as shown below) may require respacing or rail-based mounting to allow for rapid repositioning or installation of the beverage carts 100b-c within a dispensing station.

Figure 5B:
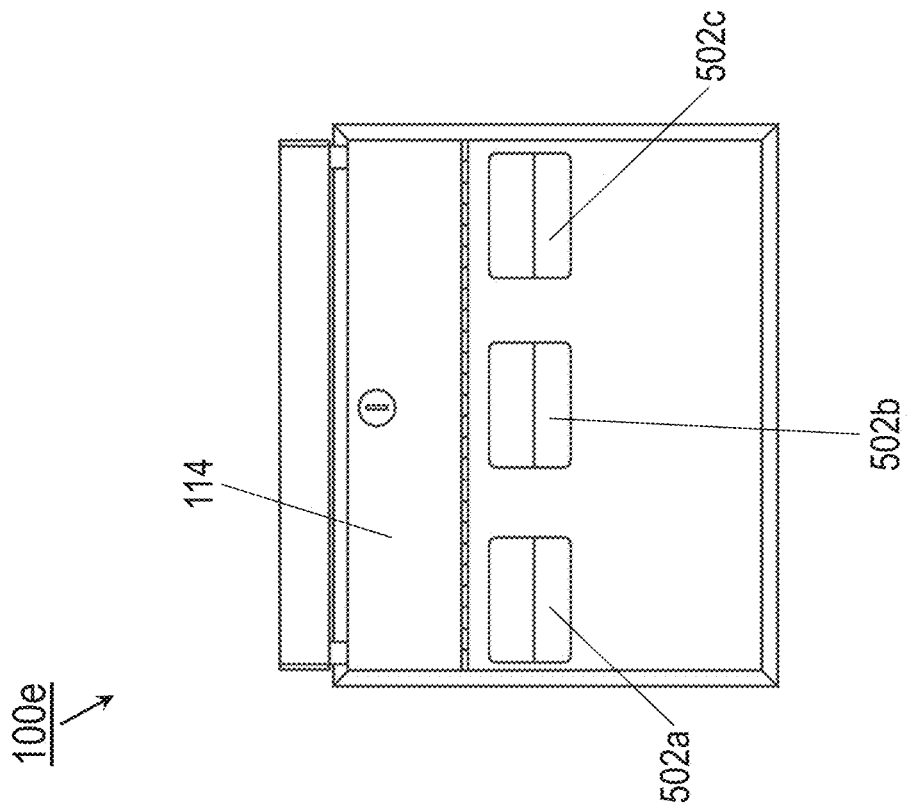
FIGS. 5A and 5B are top plan views of the beverage distribution device of FIG. 1 in alternative configurations.
Figure 5A:
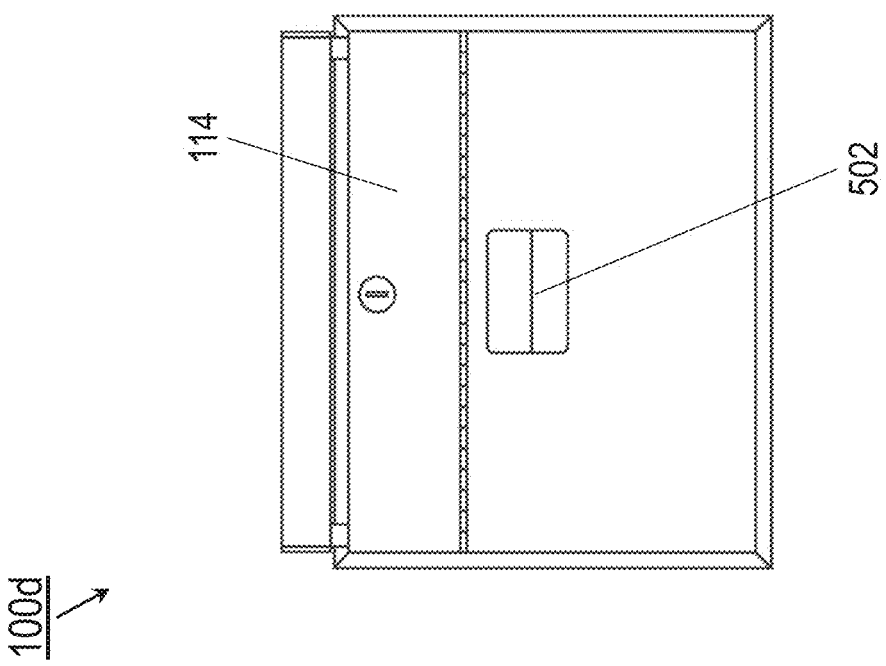

Referring to FIGS. 5A and 5B, the beverage carts 100d-e may be implemented and may function similarly to the beverage carts 100, 100a of FIGS. 1 and 2, except that the beverage carts 100d-e may include sliding finger grip catches 502, 502a-c set into the upper or top surface of the beverage carts, e.g., adjacent to the access door 114.

In embodiments, the sliding finger grip catch 502 may be used to actuate the retaining flaps (302, FIGS. 3A-B), releasing the internal raceways (116, FIG. 2) within the beverage cart 100d. Similarly, referring in particular to FIG. 5B, the beverage cart 100e may include three sliding finger grip catches 502a-c, each finger grip catch configured to actuate a single raceway 116 or segmented section (122a-c, FIG. 1) of the beverage cart.

Figure 6:
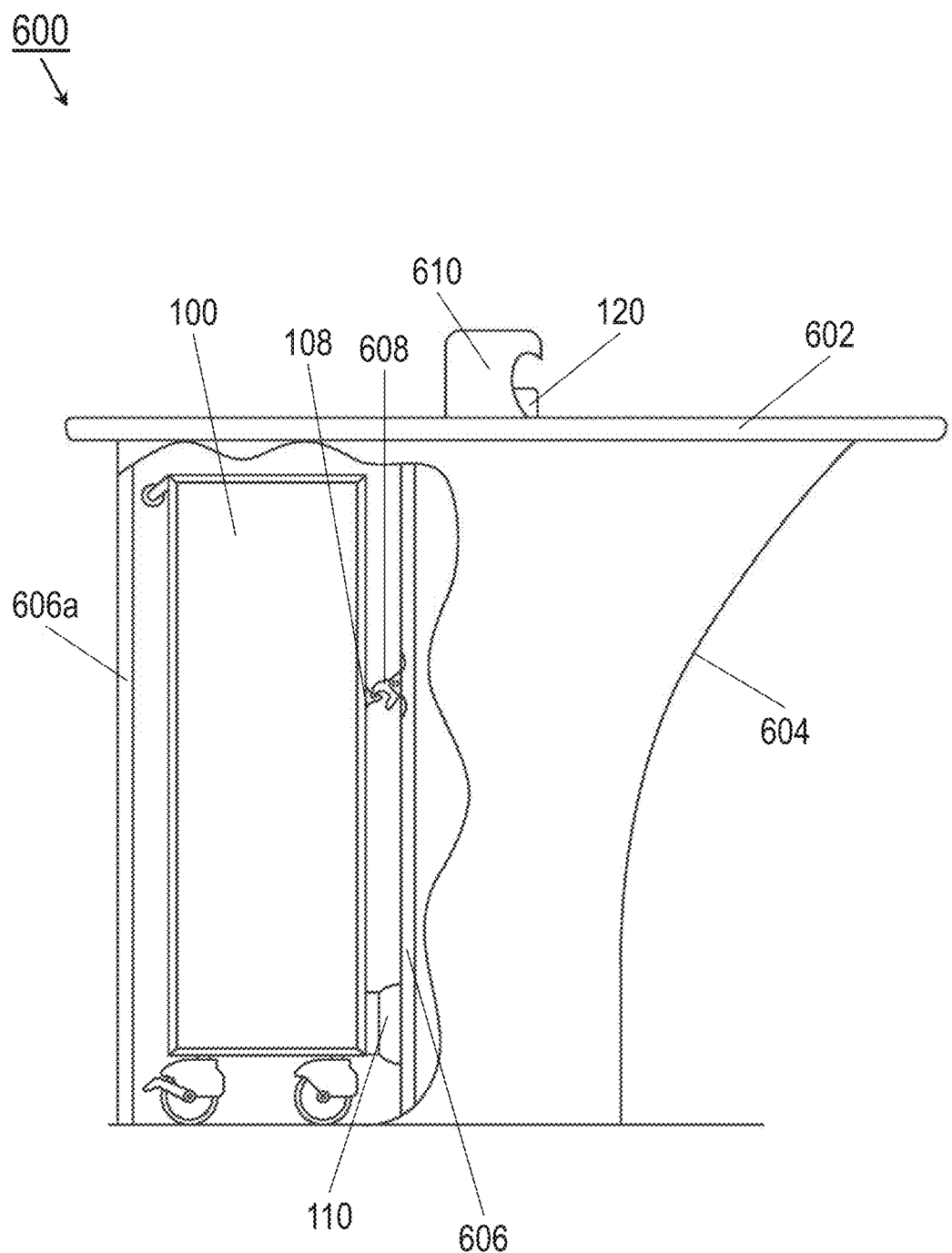
FIG. 6 is a right-side partial cutaway view of a self-vending beverage distribution station according to example embodiments of this disclosure incorporating the mobile self-vending beverage distribution device of FIG. 1.

Referring to FIG. 6, a beverage dispensing station 600 is shown. The beverage dispensing station 600 may incorporate one or more beverage carts 100 secured therein as well as a counter surface 602, forward wall 604, structural wall 606, cart latch 608, and delivery point shroud 610.

In embodiments, the beverage dispensing station 600 may be embodied in a galley monument or freestanding bar unit permanently or temporarily installed within an aircraft cabin (or within any other like vehicle of sufficient interior size) and capable of accommodating a group of consumers who may select or purchase canned beverages 120 and/or congregate around the beverage dispensing station. For example, the forward wall 604 may include one or more indentations under the counter surface 602 (or may have a generally concave shape) to accommodate seated customers.

In embodiments, one or more beverage carts 100 may be secured to the structural wall 606 underneath the counter surface 602 and connected (at the outlets 106a-c, FIG. 1) to the beverage dispensing station 600 via the bellow seals 110. For example, the beverage dispensing station 600 may include a rear wall 606a behind the beverage carts 100, e.g., to conceal the beverage carts from view or define an enclosed compartment within which the beverage carts may be secured. The beverage carts 100 may be secured in place by the cart latches 608 (e.g., engaging with the latch bars 108). In some embodiments the beverage dispensing station 600 may be staffed by an attendant, e.g., stationed behind the rear wall 606a and controlling the dispensation of canned beverages 120 from the beverage carts 100. Alternatively, customers at the forward end of the beverage dispensing station 600 (e.g., proximate to the forward wall 604) may select a canned beverage 120, which is automatically dispensed from the appropriate beverage cart 100 and delivered to the customer at a delivery point set into the counter surface 602, which delivery point may be partially obscured by the delivery point shroud 610. In some embodiments, the beverage dispensing station 600 may incorporate a card reader (not shown) set into or on the counter surface 602 to allow canned beverages 120 to be charged to customer payment cards, membership cards, or any other like customer card having either a magnetic stripe or integrated circuit (IC) chip readable by the card reader.

Figure 7:
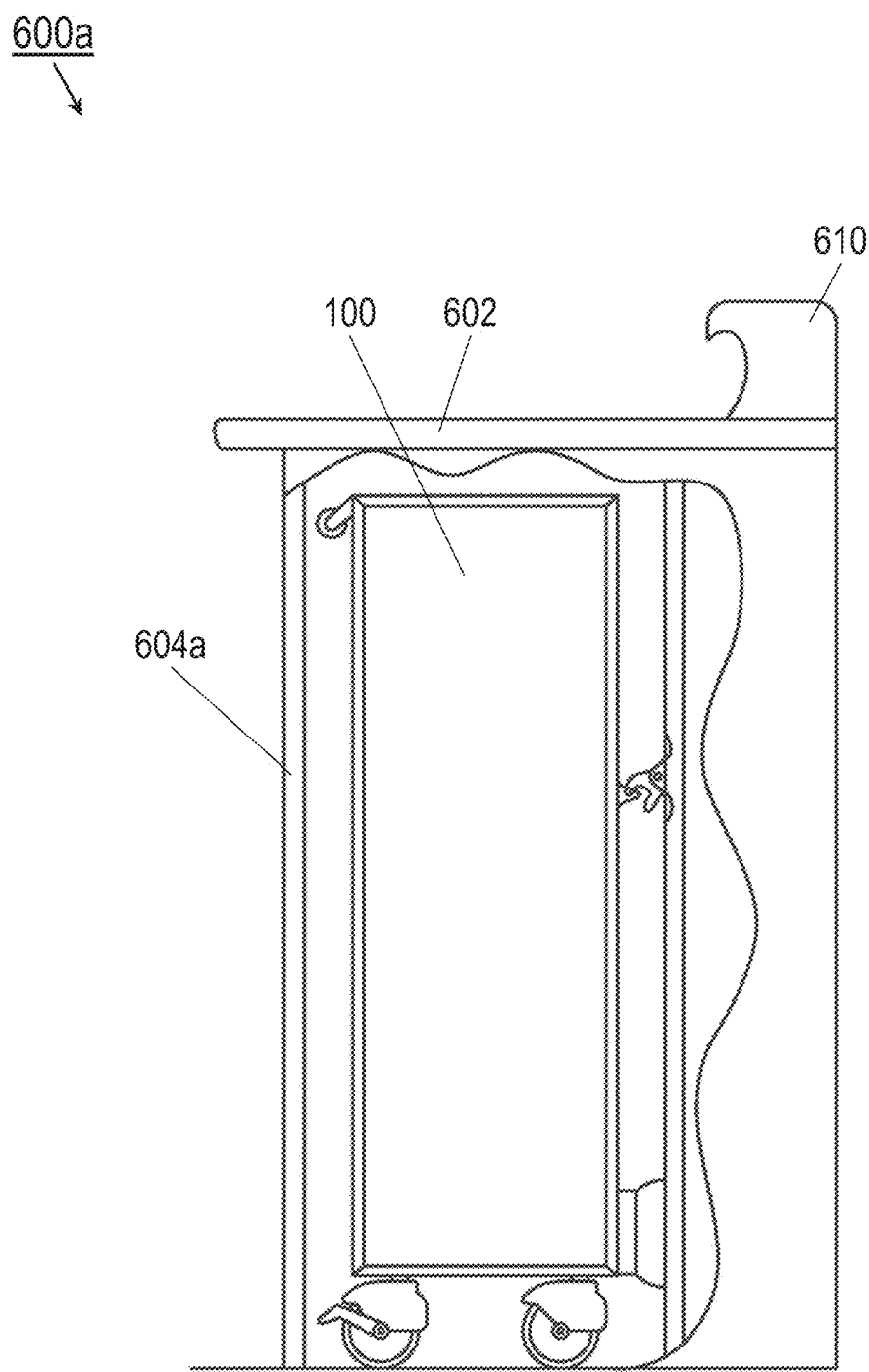
FIG. 7 is a right-side partial cutaway view of the self-vending beverage distribution station of FIG. 6 in an alternative configuration.

Referring now to FIG. 7, the beverage dispensing station 600a may be implemented and may function similarly to the beverage dispensing station 600 of FIG. 6, except that the beverage dispensing station 600a may accommodate the beverage carts 100 through a lockable forward wall 604a.

In embodiments, customers may congregate around the forward wall 604a and select canned beverages (120, FIG. 6), which are dispensed from the beverage carts 100 and delivered to the customers via delivery points set into the counter surface 602 and partially obscured by delivery point shrouds 610. For example, the beverage dispensing station 600a may be utilized (e.g., deployed laterally, in line with the aircraft fuselage or vehicle side) to serve standing customers, or in areas where space may be limited (as opposed to the beverage dispensing station 600).

Figure 8:
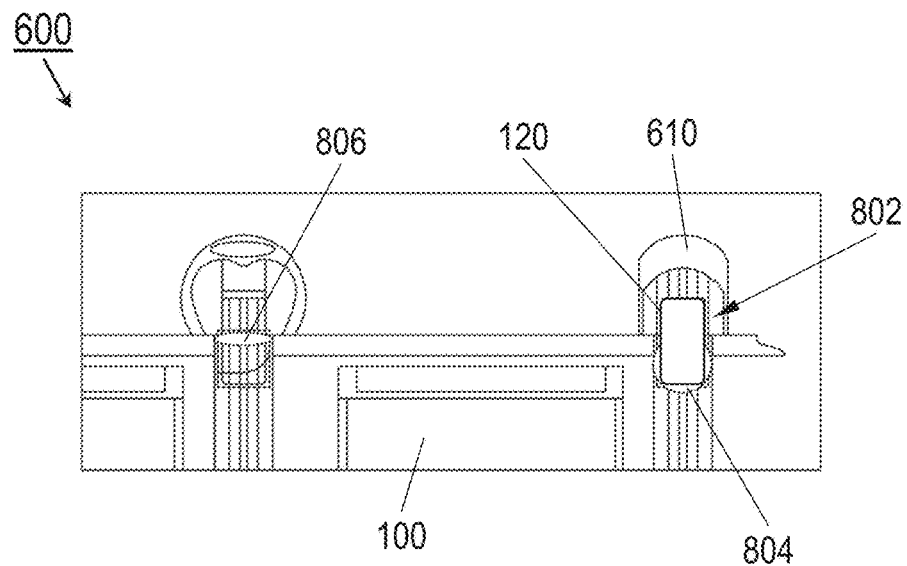
FIG. 8 is a detailed forward view of beverage delivery points of the beverage distribution station of FIGS. 6 and 7.

Referring to FIG. 8, the beverage dispensing station 600 is shown.

In embodiments, canned beverages 120 selected by customers may be dispensed from the beverage carts 100 and delivered to the customers via delivery points 802 (e.g., collection points) set into the counter surface 602 of the beverage dispensing station 600. For example, each delivery point 802 may be dedicated to a particular brand or type of canned beverage 120, or dispensable from a particular beverage cart 100. Each delivery point 802 may be partially covered by a delivery point shroud 610; the delivery point shroud may be fashioned of a rigid material and include branded or decorative elements, e.g., bespoke to a particular brand or airline; evocative of a beer pump or soft drink dispenser.

In embodiments, each delivery point shroud 610 may incorporate a downward-hinged panel or flap 804, e.g., to prevent the delivery point 802 from becoming a finger trap risk. For example, the flap 804 may pivot downward to open when a canned beverage 120 is delivered and retract into place (806) once the canned beverage has been retrieved.

Figure 9A:
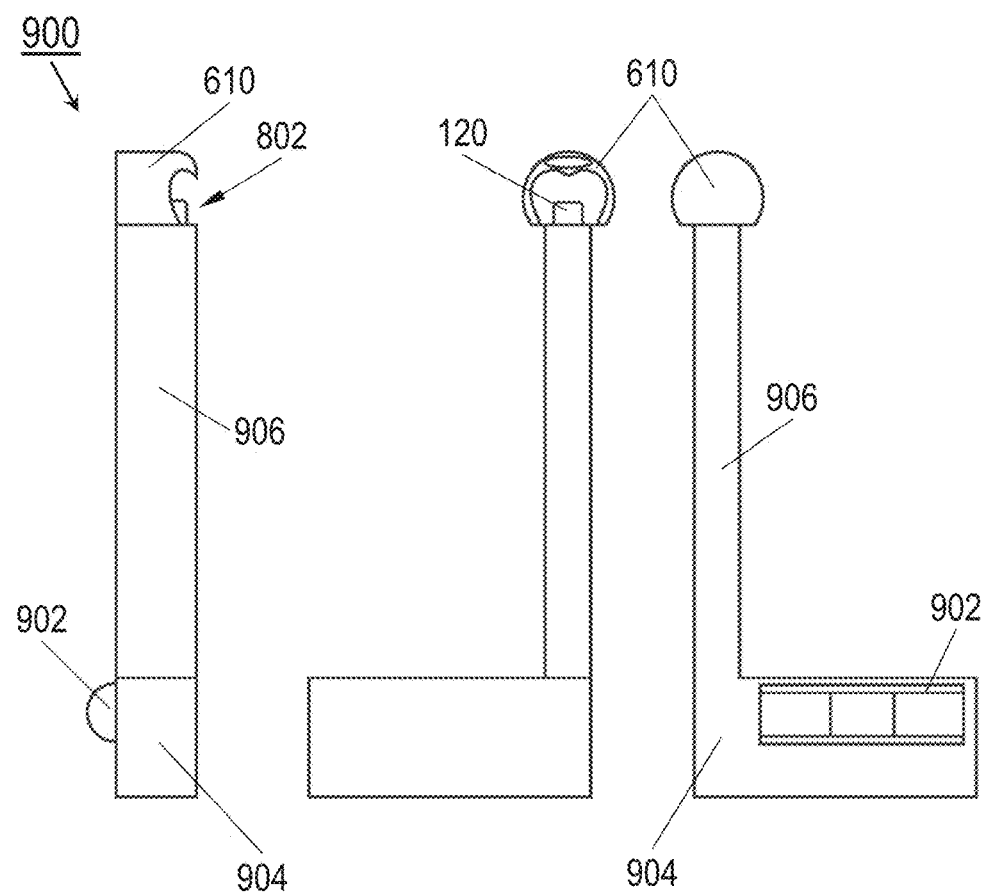
FIGS. 9A and 9B are forward, profile, and rear views of a transfer and lift device of the beverage distribution station of FIGS. 6 and 7.
Figure 9B:
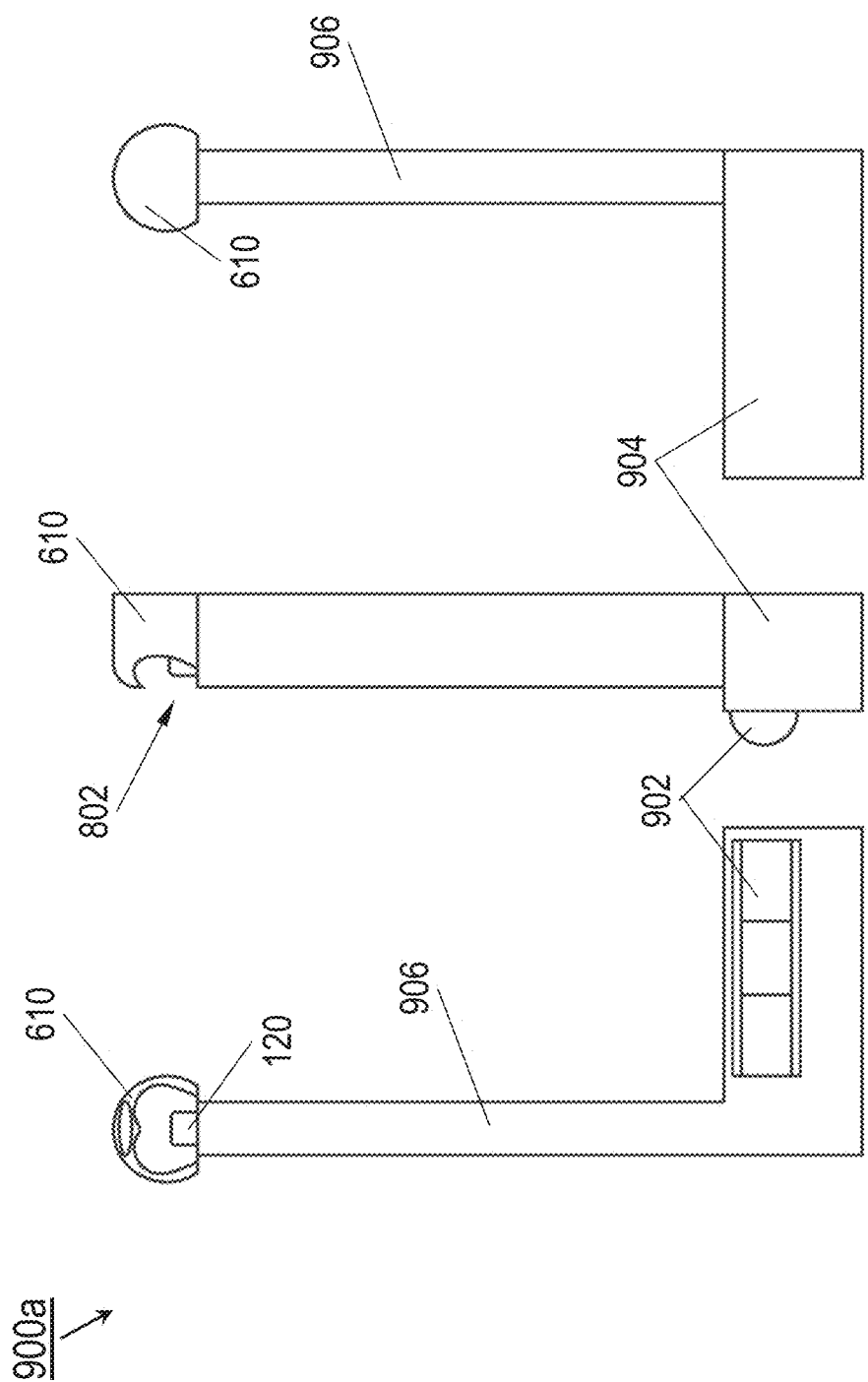

Referring to FIGS. 9A and 9B, the selection and delivery mechanisms 900, 900a are disclosed. The selection and delivery mechanism 900a of FIG. 9B may be implemented and may function similarly to the selection and delivery mechanism 900 of FIG. 9A, except that the components of the selection and delivery mechanism 900a may be inverted in configuration.

In embodiments, the beverage dispensing stations 600, 600a of FIGS. 6 and 7 may incorporate multiple selection and delivery mechanisms 900 therewithin. For example, each selection and delivery mechanism 900 may be dedicated to, and configured to collect (e.g., via a selection device 902) canned beverages 120 dispensed from, a delivery cart (100, FIGS. 6-7) and convey the selected canned beverages (e.g., via a transfer device 904 and can lift device 906) to the delivery point (802, FIG. 8) partially covered by a delivery point shroud 610.

Figure 10:
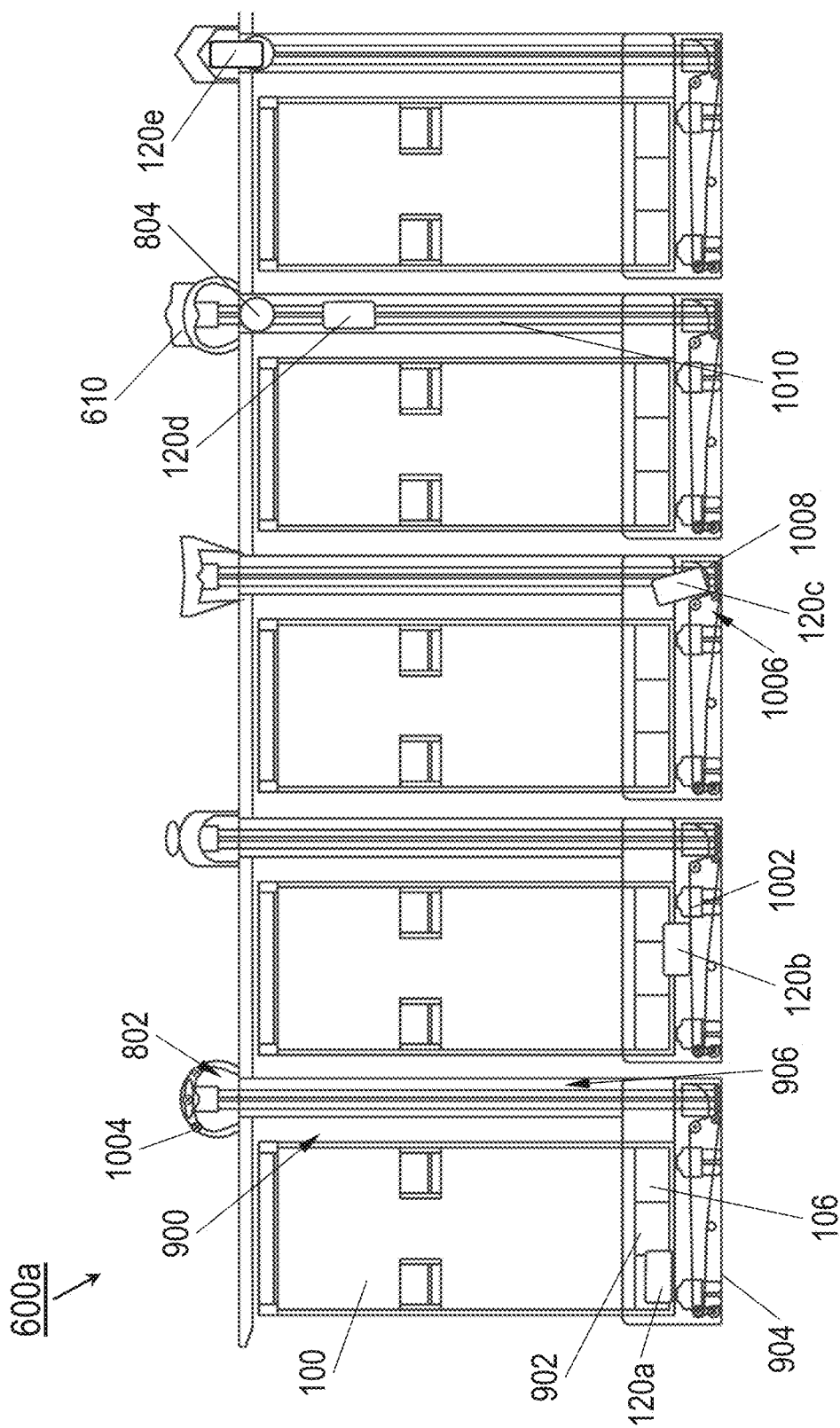
FIG. 10 is a forward detail view of the beverage distribution station of FIGS. 6 and 7.

Referring to FIG. 10, the beverage dispensing station 600a is disclosed.

In embodiments, the selection device 902, transfer device 904, and can lift device 906 of the beverage dispensing station 600a operate in concert to retrieve canned beverages 120a-e from the beverage carts 100 and deliver the selected cans to customers at the delivery points 802. For example, the operations of component subsystems of the selection and delivery mechanisms 900, e.g., selection devices 902, transfer devices 904, and can lift devices 906, may be controlled by central control processors housed within the beverage dispensing station 600a. It should be noted that the can lift device 906 may take many forms and may be configured for the delivery of bottles and other like beverage containers having a substantially or primarily cylindrical shape.

In embodiments, the canned beverage 120a has been selected by a customer (e.g., attendant, crewmember) and may be transferred via the selection device 902 from the beverage cart 100f to a shrouded conveyor 1002a within the transfer device 904. For example, the customer may select the canned beverage 120a by pressing a selector button 1004 incorporated into the delivery point shroud 610, initiating the dispensing process. Control processors may prevent out-of-sequence operation of the component subsystems and control the delivery of one canned beverage 120a; within any given set of component subsystems, additional canned beverages may be waiting in the selection device 902 or the transfer device 904 while the can lift device 906 is delivering a canned beverage to the delivery point 802.

In embodiments, the canned beverage 120b may be transferred (via the conveyor 1002 of the transfer device 904) to the base of the can lift device 906.

In embodiments, the canned beverage 120c may, at the base of the can lift device 906c, from a horizontal orientation (e.g., canned beverages 120a-b) to a vertical orientation compatible with the can lift device 906, e.g., by being upended by a change in angle (1006) at the terminal end of the conveyor 1002 and deposited into a can receiver 1008 at the base of the can lift device 906.

In embodiments, linear actuators 1010 within the can lift device 906 may raise the canned beverage 120 to the delivery point 802. Simultaneously, as the canned beverage 120d rises toward the delivery point 802, the flap 804 may open to allow the canned beverage access to the delivery point 802 and delivery point shroud 610.

In embodiments, when the canned beverage 120e arrives at the top of the can lift device 906, the canned beverage may be retrieved from within the delivery point shroud 610 by the selecting consumer, after which the flap 804 may close over the delivery point 802.

Referring to FIG. 11A, the selection device 902 is disclosed.

In embodiments, the selection device 902 may comprise a set of carriers 1102a-c housed in an outer sleeve 1104, each carrier dedicated to an outlet (106a-c, FIG. 10) and having an inner sleeve 1106. For example, the selection device 902 may mate with the bellow seals (110, FIG. 1) of the beverage cart 100, providing a transfer port from the outlets 106a-c of the beverage cart to the conveyor (1002, FIG. 10)) of the transfer device (904, FIG. 10).

Referring also to FIGS. 11B through 11D, within a given carrier 1102a, the inner sleeve 1106 may rotate (e.g., driven by a stepper motor 1108 and drive sprockets 1108a). For example, the stepper motors 1108 may be electrically powered and controlled by the control processors of the beverage dispensing station 600, 600a. The stepper motor drive sprockets 1108a may project through the carrier 1102a to a perforated, stamped or molded track in the inner sleeve 1106 to rotate the inner sleeve. The carrier 1102a may be further insulated via closed cell foam 1110 or any other like sound deadening material, but may include apertures 1112 in both sides.

In embodiments, referring in particular to FIG. 11B, the inner sleeve 1106 may include an aperture 1112 which faces vertically upward to restrain the canned beverages (120a-e, FIG. 10) within the beverage cart 100.

In embodiments, referring in particular to FIG. 11C, when a canned beverage 120 is selected, the inner sleeve 1106 may be rotated counterclockwise, accepting the canned beverage 120 into the inner sleeve.

In embodiments, referring in particular to FIG. 11D, the inner sleeve 1106 may rotate clockwise (e.g., 190 degrees, or at least 180 degrees from the position shown by FIG. 11C) to transfer the canned beverage 120 to the conveyor 1002a-e, retaining the subsequent canned beverage (e.g., the next to be dispensed) and presenting a closed face throughout the transfer, from retrieval to dispensing.

Figure 12A:
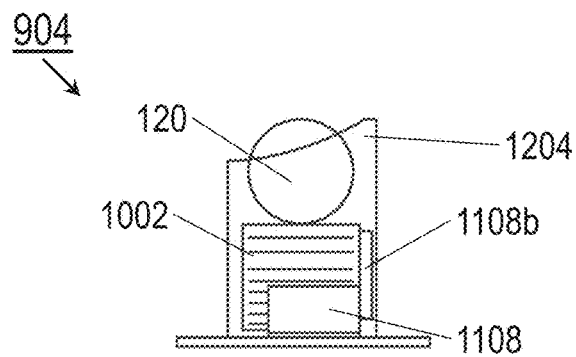
FIGS. 12A through 12C are respectively end, forward, and top plan views of a transfer device of the beverage distribution station of FIGS. 6 and 7.
Figure 12B:
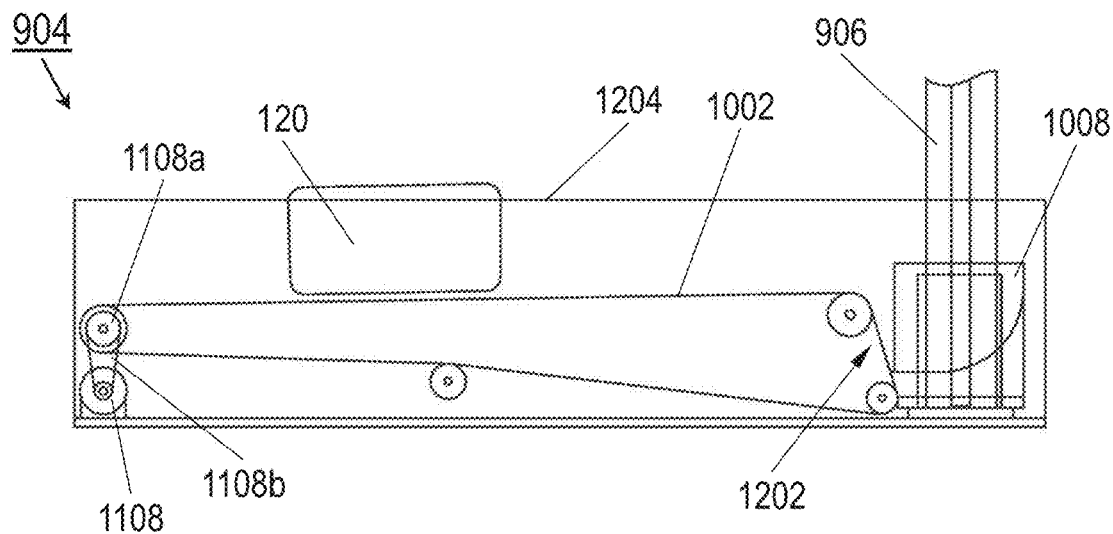
Figure 12C:
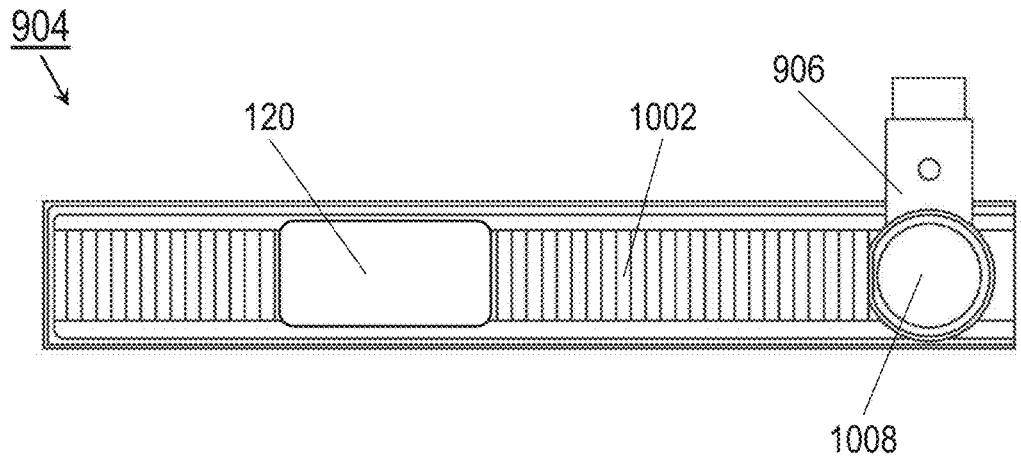

Referring to FIGS. 12A through 12C, the transfer device 904 is disclosed.

In embodiments, the conveyor 1002 (e.g., conveyor belt) may be a silicon ribbed conveyor belt driven in a continuous loop by stepper motors 1108, stepper motor drive sprockets 1108a, and stepper motor drive belt 1108b. For example, the conveyor 1002 may transfer the canned beverage 120 from the selection device (902, FIG. 11A) toward a can receiver 1008 at the base of the can lift device (906a-e, FIG. 10). As the canned beverage 120 approaches the can receiver 1008 (e.g., as determined by proximity sensors (not shown)), the angle of the conveyor 1002 may dip sharply downward (1202), transitioning the canned beverage from a horizontal to a vertical orientation as the can drops into the can receiver.

Referring to FIG. 13A, the linear actuator 1010 of the can lift device (906a-e, FIG. 10) is disclosed.

In embodiments, the can lift device 906 may include a linear actuator 1010 driven by a stepper motor 1108 at the base of the linear actuator. For example, the can receiver 1008 may attach to, and extend below, a sliding carriage 1302 configured for vertical travel along a carriage track 1304 and threaded captive rod 1306; the can receiver must extend below the sliding carriage in order to reach a low enough position to receive the canned beverage 120 from the conveyor (1002, FIGS. 12A-C)). In some embodiments the can lift device 906 is configured to lift items that are not cans, but bottles, cups and/or other containers.

Referring to FIG. 13B, the linear actuator 1010a may be implemented and may function similarly to the linear actuator 1010 of FIG. 13A, except that the stepper motor 1108 may be disposed at the top end of the carriage track 1304. In embodiments, the positioning of the stepper motor 1108 atop the carriage track 1304 may provide for a smaller can receiver 1008a aligned with, or disposed slightly above, the sliding carriage 1302.

Figure 14:
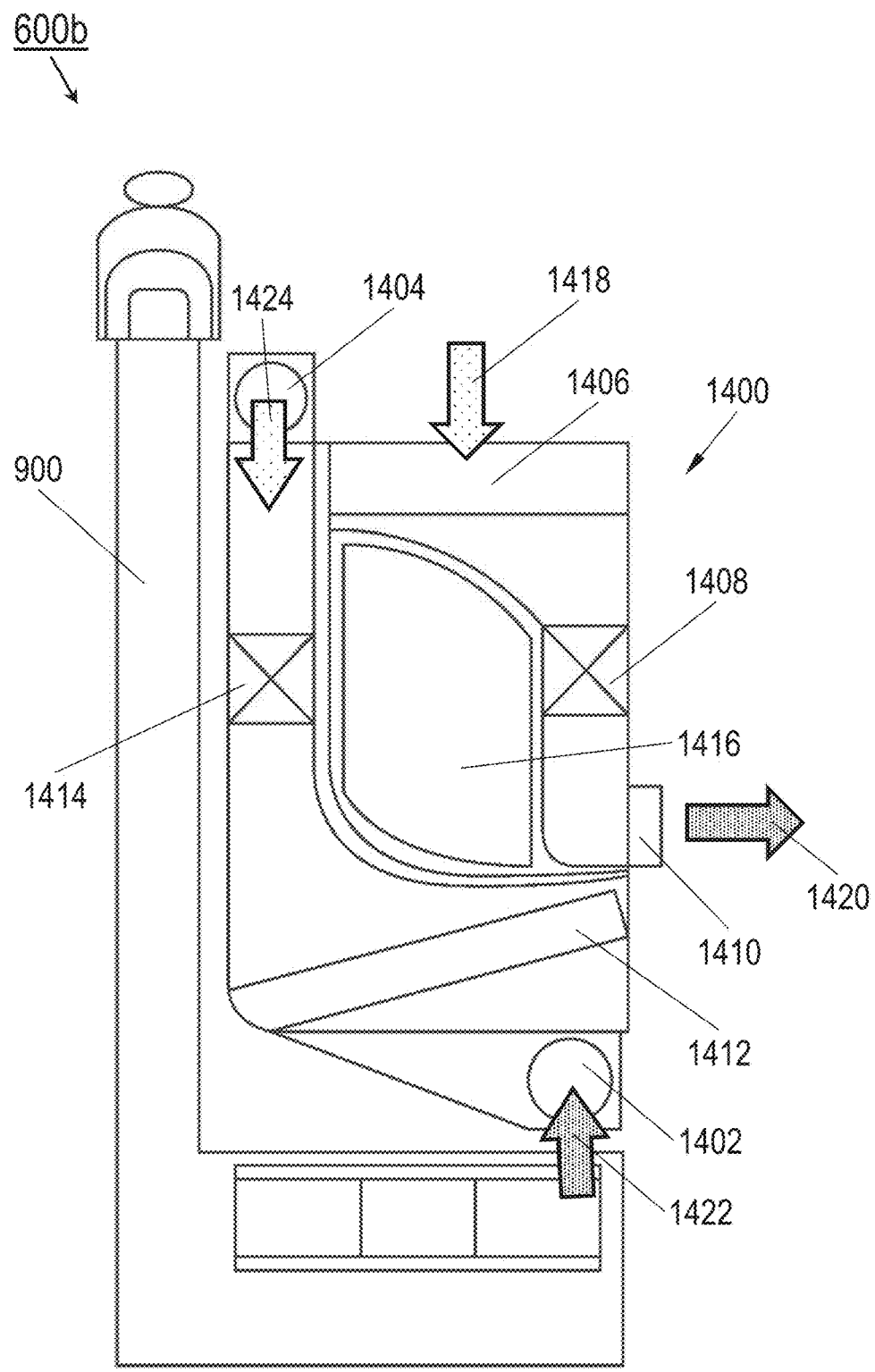
FIG. 14 is a diagrammatic cross-sectional view of the beverage distribution station of FIGS. 6 and 7 incorporating a dedicated air chiller system for storage compartments thereof.

Referring to FIG. 14, the beverage dispensing station 600b may be implemented and may function similarly to the beverage dispensing stations 600, 600a of FIGS. 6 and 7, except that the beverage dispensing station 600b may incorporate a dedicated narrow section air chiller system 1400 adjacent to the selection and delivery mechanism 900. The narrow section air chiller system 1400 may include recirculating air return 1402, recirculating air supply 1404, ambient air condenser 1406 and condenser fan 1408, exhaust vent 1410, chiller evaporator 1412 and evaporator fan 1414, and compressor system 1416.

In embodiments, the air chiller system 1400 may provide air-over chilling of an enclosed compartment within the beverage dispensing station 600b, and thus chilling of beverage carts (100, FIG. 1) stowed or secured within the enclosed compartment. In some embodiments the air chiller system 1400 and beverage cart 100 may be configured for "air-through" direct chilling of the beverage cart 100 and its contents. For example, the air chiller system 1400 may be deployed if the aircraft or vehicle aboard which the beverage carts 100 are stowed or utilized is not otherwise equipped with a galley-based air chiller system.

In embodiments, ambient air (1418) may be drawn into the condenser 1406 by the condenser fan 1408 to remove the latent heat from expanded refrigerant gas, allowing the gas to recompress and liquefy. The surplus heated ambient air may be vented (1420) out of the beverage dispensing station 600b, e.g., into an air extraction duct.

In embodiments, a recirculating chilled air supply 1422 may be drawn into the air chiller system 1400 through the air return 1402 and through the chiller evaporator 1412 by the evaporator fans 1414. The chiller evaporator 1412 may be chilled by, e.g., the reliquification of the refrigerant gas chilled by the condenser 1406 and rapid expansion through a flow control valve (e.g., thermostatic expansion value (TXV)). Chilled recirculating air may be returned to the enclosed compartment via the air supply 1404.

In some embodiments, the enclosed compartment within the beverage dispensing station 600b may be chilled via any appropriate compact alternative means.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A mobile self-vending beverage distribution device, comprising:
   a housing transportable along a surface via one or more casters attached to a bottom surface of the housing, the housing divided into a plurality of segmented sections and including at least one access door, one or more of the segmented sections installable and removable via the access door, each segmented section comprising:
      an outlet proximate to the bottom surface, the outlet configured to dispense one or more cylindrical beverage containers;
      an access hatch proximate to a top surface of the housing, the one or more beverage containers loadable into the segmented section via the access hatch; and
      a raceway connecting the access hatch to the outlet, the raceway comprising a plurality of raceway components attached to at least one interior surface of the segmented section, the plurality of raceway components collectively configured to direct the one or more cylindrical beverage containers in a gravitationally assisted path from the access hatch to the outlet.

2. The mobile self-vending beverage distribution device of claim 1, wherein the plurality of segmented sections includes:
   at least one first segmented section corresponding to a plurality of first beverage containers having a first diameter; and
   at least one second segmented section corresponding to a plurality of second beverage containers having a second diameter.

3. The mobile self-vending beverage distribution device of claim 1, further comprising:
   at least one latch bar mounted to an exterior surface of the housing, the housing securable to a latching fixture via the latch bar.

4. The mobile self-vending beverage distribution device of claim 1, wherein each outlet includes a flap release mechanism configured to individually release the one or more beverage containers through the outlet.

5. The mobile self-vending beverage distribution device of claim 4, further comprising:
   a plunger externally mounted proximate to the outlet, the plunger articulable to activate the flap release mechanism.

6. The mobile self-vending beverage distribution device of claim 1, wherein one or more dimensions of the housing correspond to a galley cart of standard size.

7. The mobile self-vending beverage distribution device of claim 1, wherein:
   the housing is transportable along the surface in a primary direction; and
   the gravitationally assisted path is associated with a secondary direction perpendicular to the primary direction.

8. The mobile self-vending beverage distribution device of claim 1, further comprising:
   at least one catch set into the top surface, the catch articulable for at least one of activating the access door and releasing the at least one segmented section.

9. The mobile self-vending beverage distribution device of claim 8, wherein:
   the at least one catch comprises a plurality of catches, each catch configured for releasing a segmented section of the plurality of segmented sections.

10. The mobile self-vending beverage distribution device of claim 3, wherein:
    each segmented section includes a flexible bellow attached to the outlet, the flexible bellow connectible to the latching fixture.

* * * * *